United States Patent
Forster et al.

[11] 3,824,446
[45] July 16, 1974

[54] CONTROLLED RECTIFIER

[75] Inventors: Johannes Forster; Karl-Heinz Bezold; Gerhard Vitt, all of Berlin, Germany

[73] Assignee: Licentia Patent-Verwaltungs-GmbH, Frankfurt, Germany

[22] Filed: Feb. 22, 1973

[21] Appl. No.: 334,756

[30] Foreign Application Priority Data
Feb. 22, 1972 Germany............................ 2209293

[52] U.S. Cl..................... 321/12, 321/13, 321/18, 321/45 C, 318/138
[51] Int. Cl. ................................. H02m 1/18, H02p
[58] Field of Search ............... 321/5, 11, 12, 13, 18, 321/45 C, 44; 307/252 L, 252 M, 252 Q; 318/138, 439

[56] References Cited
UNITED STATES PATENTS
3,504,266 3/1970 Schlabach et al.................. 321/45 C
3,737,759 3/1972 Pollard.............................. 321/45 C FOREIGN PATENTS OR APPLICATIONS
1,210,076 2/1966 Germany ......................... 318/138

959,458 6/1964 Great Britain ....................... 321/18

Primary Examiner—William H. Beha, Jr.
Attorney, Agent, or Firm—Spencer & Kaye

[57] ABSTRACT

A rectifier circuit, for alternating current, has a plurality of controlled rectifiers and a separate quenching device for each of the controlled rectifiers. Each quenching device is connected in parallel with its associated controlled rectifier and includes a quenching thyristor and a quenching capacitor connected in series. A supplemental capacitor is connected in parallel with each of the quenching capacitors. A coupling diode is in the path connecting the supplemental capacitor with the quenching capacitor. This coupling diode and the supplemental capacitor are arranged so that the supplemental capacitor can only be charged during the period when the polarity of the quenching capacitor is changed, which occurs when the quenching capacitor is being recharged in the reverse direction after quenching of the associated controlled rectifier. The supplemental capacitor is coupled to a load which is attached to the D.C. output terminals of the rectifier. A discharge device enables the supplemental capacitor to be discharged through the load.

13 Claims, 8 Drawing Figures

CONTROLLED RECTIFIER

BACKGROUND OF THE INVENTION

The present invention relates to rectifier circuits having controlled rectifiers and associated quenching circuits connected in parallel with the controlled rectifiers. Each of these quenching circuits includes a quenching capacitor and a quenching thyristor which are connected in series.

Such controlled rectifiers are known, for example from German Offenlegungsschrift (Laid Open Application) No. 1,563,240, and corresponding quenching circuits, for example, from the book "Thristoren" by Heumann/Stumpe, published by Teubner-Verlag, 1969, page 154.

In controlled rectifier circuits of the above-mentioned type the control or regulation of the voltage current supplied by the rectifier circuit is accomplished by switching on the controlled rectifiers at selected moments and then switching them off by use of the quenching circuits. To quench the controlled rectifiers by the quenching circuits, the voltage of the quenching capacitor is applied across, i.e. in parallel with the associated controlled rectifier, by firing the associated quenching thyristor, with such a polarity that the controlled rectifier is quenched. This causes the current flowing through the rectifier circuit input transformer to commutate almost without delay from the controlled rectifier to the quenching thyristor and to charge the quenching capacitor from the one polarity to the opposite polarity to a voltage value determined by the energy stored at the moment of quenching in the inductances of the transformer winding as well as in the lines.

The following energy equation substantially applies:

$$L \cdot i^2/2 = C(\hat{V}^2 - V_1^2)/2 \tag{1}$$

wherein: L is the resulting inductance of the quenching circuit (transformer winding and other inductances): $i$ is the momentary value of the current to be quenched; C is the capacitance of the quenching circuit; $V_1$ is the required quenching voltage at the capacitor at the time of quenching; and the $\hat{V}$ is voltage at the capacitor after recharging. The latter voltage $\hat{V}$, since it is generally higher than the required quenching voltage $V_1$, determines the voltage stress on the quenching capacitors and the controlled and the noncontrolled rectifiers.

The capacitance C of the quenching capacitor required for quenching the momentarily flowing current $i$ can be approximately calculated upon taking into consideration the period of protection $t_s$ necessary for the controlled rectifiers according to the protection period criterion:

$$C = i \cdot t_s/V_1 \tag{2}$$

The protection period $t_s$ indicates how long the controlled rectifiers which are to be quenched have inverse voltage (see FIG. 3). Protection period $t_s$ must be larger than the turn-off Time $t_q$. After the turn-off Time $t_q$ has elapsed, controlled rectifiers are able to absorb forward voltage.

From the above approximation equations the highest possible value of the excess voltage $\hat{V}$ can be calculated as follows:

$$V = V_1 \sqrt{(L \cdot i/t_s \cdot V_1) + 1} \tag{3}$$

The voltage stress on the quenching capacitors and on the rectifiers as compared to the required quenching voltages $V_1$ is thus increased by a factor which depends on the inductance of the leads and transformer windings as well as on the momentary value of the current to be quenched.

SUMMARY OF THE INVENTION

An object of the present invention is to provide a circuit arrangement which makes it possible to effectively limit the peak value for the capacitor voltage in order to prevent excess voltages from affecting the circuit elements particularly the rectifiers and quenching capacitors, and simultaneously to reduce the dV/dt stress placed on the controlled rectifiers after the end of the protection period.

Another object of the present invention is to transfer substantially all of the quenching energy $L \cdot i^2/2$ to the direct current load for the purpose of increasing the effective limits of the voltage.

These objectives are accomplished in a controlled rectifier circuit of the above-mentioned type, according to the present invention, by providing supplemental capacitors connected in parallel with the quenching capacitors via coupling diodes. These supplemental capacitors are chargeable only during the period of change of the polarity of the voltage in the quenching capacitors due to the orientation of the coupling diodes and are dischargeable through a load circuit via a parallel resistance and/or a set of auxiliary thyristor connected to the load circuit.

DESCRIPTION OF THE PREFERRED EMBODIMENTS

Figure 1:
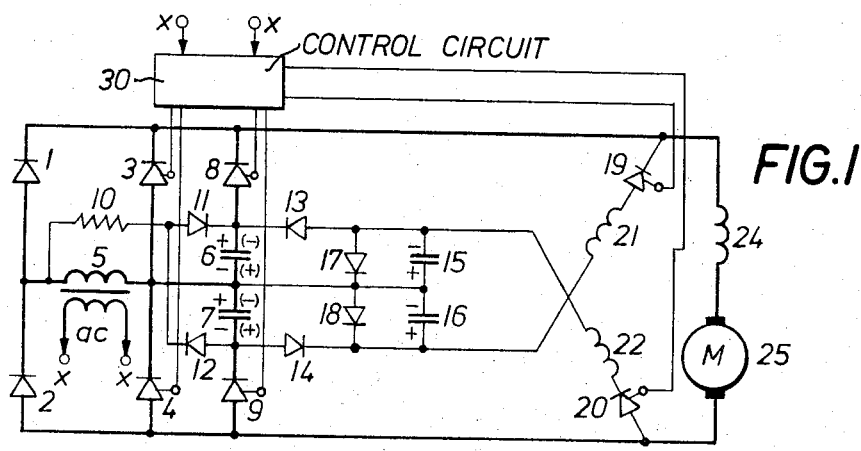
FIG. 1 shows one embodiment of a single phase rectifier bridge circuit constructed in accordance with the present invention.

The controlled rectifier circuit shown in FIG. 1 includes a single phase bridge circuit having controlled rectifiers 3, 4 each connected in a respective one of two branches and noncontrolled rectifiers 1,2 each connected in a respective one of the other two branches. The secondary winding 5 of an input transformer is disposed in the diagonal of the bridge circuit, i.e. between the A.C. input terminals of the bridge circuit. The primary winding of the transformer is connected to the A.C. supply voltage to furnish the A.C. supply voltage to the rectifier circuit. Each controlled rectifier 3, 4 has associated with it a respective quenching circuit which includes the series connection of a quenching thyristor 8 or 9 and a quenching capacitor 6 or 7, respectively, with each of the series circuits 6 and 8 or 7 and 9 being connected in parallel with the associated controlled rectifiers 3 or 4 respectively.

Charging diodes 11, 12 which are each connected with one of the terminals of the secondary winding 5 via a common charging resistor 10 establish the charging paths for the quenching capacitors.

Connected to the D.C. output terminals of the rectifier circuit is a load, which is illustrated, includes a smoothing choke 24 connected in series with a direct current motor 25. In accordance with the embodiment of the present invention shown in FIG. 1, each quenching capacitor 6, 7 is connected in parallel with a respective supplemental capacitor 15, 16 via a respective coupling diode 13, 14. The supplemental capacitors 15 and 16 are connected in series. The coupling diodes 13 and 14 are arranged with such an orientation that the supplemental capacitors 15 and 16, in contrast to the quenching capacitors 6 and 7, cannot be charged via the charging diodes 11 and 12 respectively. Diodes 17 and 18, which are each connected in parallel with a respective one of the supplemental capacitors 15 and 16 are also provided to prevent these supplemental capacitors from taking on another polarity than that shown (FIG. 1).

The positive terminal of the series connection of the supplemental capacitors 15 and 16 is connected, via an auxiliary thyristor 19, with the terminal of load 24, 25 which is connected to the positive output terminal of the rectifier circuit and the negative terminal of the series connection of capacitors 15 and 16 is connected, via a further auxiliary, thyristor 20, to the terminal of the rectifier circuit. Reactances 21, 22 which are each connected in series with an associated auxiliary thyristor 19, 20 are utilized to favorably modify the current load in the auxiliary thyristors 19, 20 respectively.

The circuit arrangement of the embodiment of the present invention shown in FIG. 1 operates as follows:

The two quenching capacitors 6, 7 are charged to the polarity shown in FIG. 1 by the A.C. supply voltage, from the secondary coil 5 of the input transformer, through the charging paths including the charging diodes 11, 12 and charging resistor 10. In a known manner, the control circuit 30, which monitors the A.C. supply voltage, can also supply the firing signals to the quenching thyristor 8 or 9 for firing the respective thyristor at a selected time which causes the discharge of the quenching capacitor 6 or 7, respectively, connected in series therewith. Such a control circuit is shown in F. W. Gutzwiller et al., SILICON CONTROLLED RECTIFIER MANUAL, Third Edition, General Electric Company (1964), FIG. 8.2.3 on page 136 and described in chapter 8.4, beginning on page 130.

This discharge of the quenching capacitor 6 or 7 initiates the quenching of the associated controlled rectifier 3 or 4, respectively. Consequently, the quenching capacitor is subsequently recharged from the polarity illustrated to the polarity indicated in parentheses. This recharging of the quenching capacitors with an opposite polarity occurs because the current flowing through the transformer winding 5 commutates from the controlled rectifier to the fired quenching thyristor and thus the energy stored in the circuit, particularly in the inductance of the transformer, is transferred to the capacitance effective in the recharging circuit. Assuming, for example, that the controlled rectifier 3 is conducting current, then by firing the quenching thyristor 8 the quenching capacitor 6, which is charged to the polarity illustrated will be connected in parallel with the controlled rectifier 3 so that the current in the rectifier 3 is quenched. The current flowing through transformer winding 5 commutates from the controlled rectifier 3 to the quenching thyristor 8 so that the quenching capacitor 6 is recharged in the direction indicated in the parentheses. At the moment when the polarity of the capacitor voltage is reversed due to the recharging, the blocking diode 13, which had previously been in a blocking condition by the initial voltage on the quenching capacitor 6, becomes conductive so that the supplemental capacitor 15 is now connected in parallel with the quenching capacitor 6. Consequently the current now flows from the transformer winding 5 through the quenching capacitor 6 and on the other hand through the supplemental capacitor 15 and the blocking diode 13.

Figure 3:
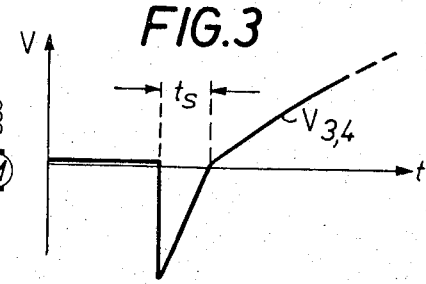
FIG. 3 provides a graph of the blocking voltage across the controlled rectifiers with respect to time in a circuit arrangement according to the present invention.

As shown in FIG. 3, which provides an illustration of the voltage across the presently quenched controlled rectifier, at first only a low capacitance is effectively included within the circuit, i.e. the quenching capacitor, and that the parallel supplemental capacitor only becomes effective, due to the orientation of the coupling diode, at the moment when the polarity of the voltage at the quenching capacitor changes to the polarity shown in parentheses. Since the effective capacitance is then increased, a kink results in the voltage curve and the rate of change of the voltage with respect to time, $dV/dt$, decreases due to the higher effective capacitance. Furthermore, due to this increase in the effective capacitance, the voltage to which the quenching capacitor and the parallel connected supplemental capacitor are charged during this recharging period becomes lower than if only the quenching capacitor were present.

In accordance with the present invention, the dimensions of the capacitors can be selected in order to satisfy the conditions required by the desired operation. The quenching capacitors are preferably dimensioned to have a relatively small value of capacitance, which value need only be selected to satisfy the protection period criterion:

$$C = i \cdot t_s/V_1$$

The appearance of unduly high voltage within the circuit are eliminated however, since the supplemental capacitors are dimensioned in accordance with equation (1) exclusively with respect to the permissible voltage and consequently have a larger value of capacitance than the quenching capacitors. As can be seen from the voltage curve in FIG. 3, the supplemental capacitors are not effectively included within the circuit during the recharging period determinative of the protection period $t_s$. As also shown in FIG. 3, the slope of the voltage curve $dV/dt$ decreases due to the parallel connection of the supplemental capacitors. This means that the protection period $t_s$ required for the controlled rectifiers 3, 4 can also become shorter since it depends on the voltage slope $dV/dt$.

A further significant advantage within the present invention is that the larger supplemental capacitors need not be bipolarly stressed but only monopolarly and therefore, can be simple direct voltage capacitors which are sufficiently lighter in weight and less expensive than alternating voltage capacitors.

The supplemental capacitors 15, 16 act as intermediate storage units for the quenching energy. The energy stored within the supplemental capacitors can be fed to the direct current load circuit 24, 25 by firing the auxiliary thyristors 19, 20 thus increasing the average voltage applied to the load. In the present example, both auxiliary thyristors 19, 20 are simultaneously fired twice per period, which firing takes place during the zero passage of the alternating voltage or during the commutation gaps. This firing of the auxiliary thyristors 19, 20 results in the supplemental capacitors 15, 16 being discharged to zero. This arrangement provides for optimum transfer of the quenching energy to the load.

The proposed arrangement of the capacitors effectively limits the voltage within the capacitors and the controlled and non-controlled rectifiers and also limits the rate of change of the voltage $dV/dt$ across the controlled rectifiers. Furthermore, substantial decoupling from the alternating current supply lines is obtained thus reducing the harmonics which can be measured in the supply lines. The harmonics in the supply lines become smaller as the size of the supplemental capacitors is increased. This means that not only the displacement factor cos $\zeta$ of the fundamental oscillation but also the total power factor $\lambda$ can be improved with the aid of quenchable rectifiers in addition to the reduction of the interfering current. The latter becomes even more significant with the selection of a larger resistance value for the charging resistor 10 in the charging circuit. The time constant which is determined by the charging resistance and the quenching capacitor, however, should not exceed one period of the A.C. input signal in order to assure that the entire arrangement continues to operate even if there is a temporary failure in the power line.

Figure 2:
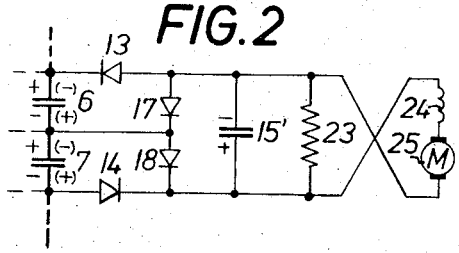
FIG. 2 shows a modified portion of the circuit shown in FIG. 1 in that the two supplemental capacitors are replaced by one single capacitor and the auxiliary thyristors by a parallel resistance.

FIG. 2 shows a modified embodiment of the circuit arrangement shown in FIG. 1 in accordance with the present invention. In this modified arrangement the two quenching capacitors 6, 7 of two rectifier branches which are directly connected in series as regards their direct current, for example the branches containing rectifiers 3 and 4, are connected in parallel with a common single supplemental capacitor 15'. This modified circuit arrangement of FIG. 2 also includes a discharging resistor 23 which is connected in parallel with the supplemental capacitor 15'. This resistor 23 can be provided instead of the auxiliary thyristors 19, 20 of FIG. 1. This substitution would eliminate a few advantages of the circuit shown in FIG. 1 with the auxiliary thyristors, such as better efficiency and an increase in the direct voltage, but the circuitry required for the discharge of the supplemental capacitors would be simplified and reduced. This discharging resistor 23 can also be utilized in place of the auxiliary thyristors 19 and 20 in the embodiment shown in FIG. 1 which includes two supplemental capacitors. This modified circuit arrangement operates in the same manner as that of FIG. 1.

Figure 4:
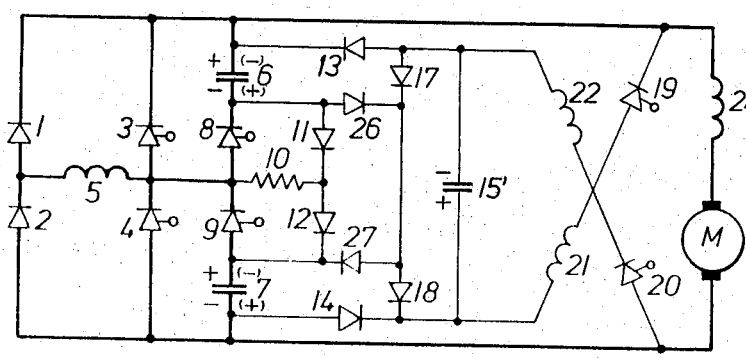
FIGS. 4–6 show single phase rectifier circuits encompassing additional embodiments of the present invention.

FIG. 4 shows a further embodiment of a single phase bridge circuit constructed in accordance with the present invention in which the position of each of the quenching thyristors 8, 9 and its associated quenching capacitors 6, 7 respectively, are interchanged as compared to their position in FIG. 1. Two further coupling diodes 26, 27 are additionally provided. The first extra coupling diode 26 is connected between the point of connection of the quenching thyristor 8 and the quenching capacitor 6 and the point of connection of the diodes 17 and 18. The second extra coupling diode 27 is similarly connected to its associated quenching thyristor 9 and quenching capacitor 7. Principally the operation of this circuit is similar to the operation of the circuit arrangement of FIG. 1. As before, the supplemental capacitor 15' common to the two quenching capacitors 6, 7 becomes effective only when the voltage across one of the quenching capacitors 6 or 7 changes its polarity. The transformer current then flows along a first path through the quenching thyristor 8 and the quenching capacitor 6 and also along a second path through quenching thyristor 8, blocking diode 26, parallel diode 18, supplemental capacitor 15 and blocking diode 13. After blocking of the quenching thyristor 8, the quenching capacitor 6 is again charged via diode 1, charging diode 11 and charging resistor 10 to its original polarity required to quench the controlled rectifier 3.

In FIG. 4, the coupling diodes 13, 14, 26, 27 and parallel diodes 17, 18 are arranged so that complete decoupling from the A.C. network is achieved. This complete decoupling is especially advantageous when the discharging of the supplemental capacitors is to take place during the zero passage of the voltage or during the commutation gap and the controlled rectifiers 3, 4 are to be fired at control angles which are greater than $\alpha = 0°$. Under such conditions the danger would exist in a circuit arrangement constructed in accordance with FIG. 1 that current would flow through the associated parallel diode 17, 18 during the period during which a positive blocking voltage existed across these rectifiers.

Figure 5:
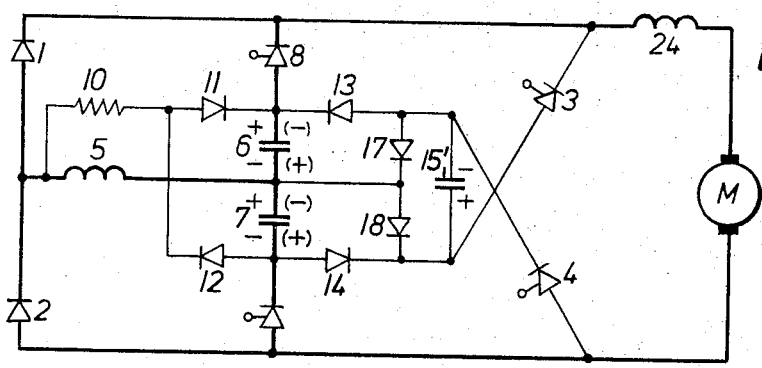
Figure 6:
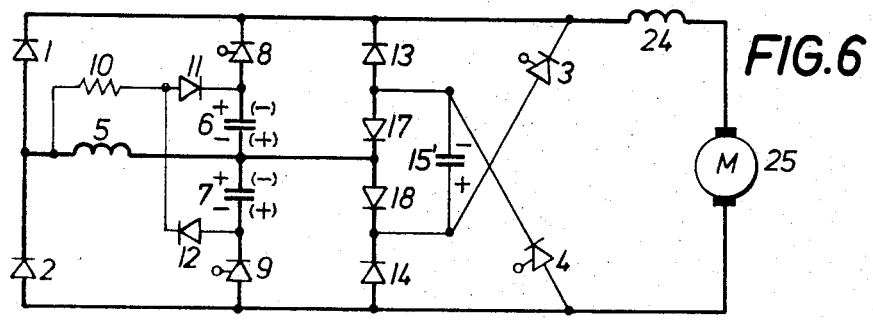

The circuit arrangements shown in FIG. 5 and 6 constitute two significant further embodiments of the present invention.

In these circuit arrangements, the supplemental capacitor 15', or in the alternative supplemental capacitors 15, 16, the parallel diodes 17, 18 and the controlled rectifiers 3, 4 respectively, are arranged in such a manner as to eliminate the need for additional thyristors for the purpose of discharging the supplemental capacitor 15'. This task of discharging the supplemental capacitor 15' is taken over by the controlled rectifiers 3, 4 which are connected between the supplemental capacitor 15' and the terminals of the load. In these circuit arrangements, the load current flows through the series connection of either the parallel diode 17 and the controlled rectifier 4 or the parallel diode 18 and the controlled rectifier 3. Outside of this modification of the discharge path for the supplemental capacitor 15', the operation of the circuit is principally the same as the operation of the circuit of FIG. 1. Only when the polarity of the quenching capacitor is reversed does the supplemental capacitor become effective within the recharging circuit.

In the circuit of FIG. 5, upon discharge of the quenching capacitor and the resulting quenching of the associated controlled rectifier, the transformer current will then flow along a first path through the quenching capacitor 6 or 7, and also along a second path through the associated parallel diode, 18 or 17, the supplemental capacitor 15' and the associated blocking diode 18, or 14, respectively. The entire charging current from both paths flows through the quenching thyristor, 8 or 9. In contrast to this current flow in the circuit of FIG. 5, according to the circuit arrangement of FIG. 6 only that portion of the transformer current which is fed to the quenching capacitor 6 or 7 flows through the quenching thyristor 8 or 9 while the portion fed to the supplemental capacitor flows through the associated blocking diode 13 or 14 both of which are directly connected to the D.C. output terminals of the rectifier circuit. In order to discharge the charged supplemental capacitor 15', the controlled rectifiers are both fired simultaneously either at the beginning or at the end of each half period of the alternating supply voltage.

The present invention is not limited to being only incorporated into single phase bridge circuits such as the exemplary embodiments illustrated in FIGS. 1, 2, 4, 5 and 6.

Figure 7:
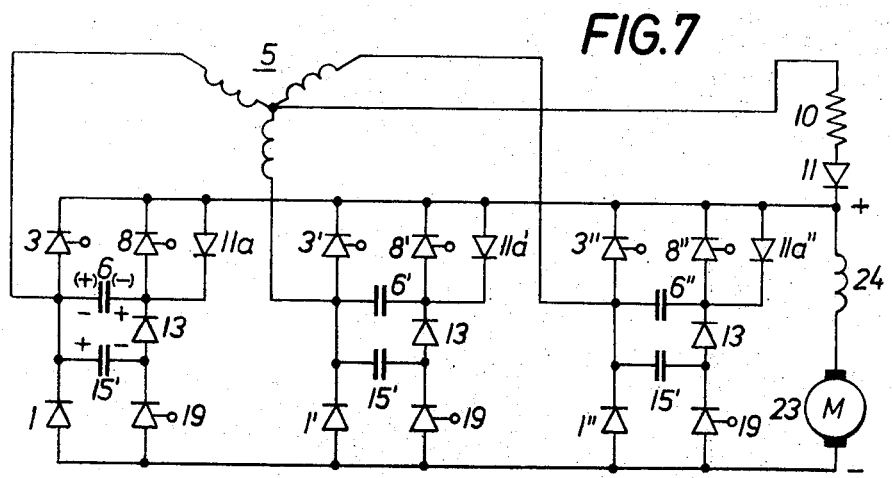
FIGS. 7 and 8 show examples of three phase rectifier circuits constructed in accordance with the present invention.
Figure 8:
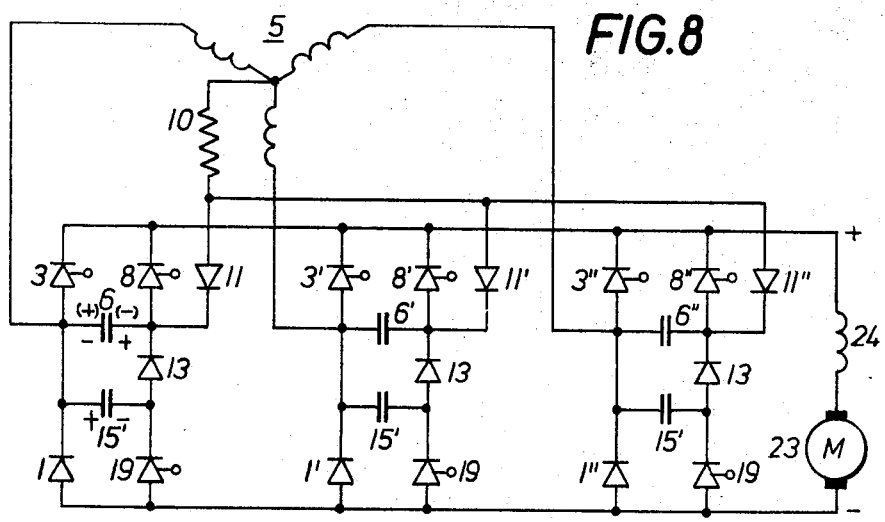

Two exemplary embodiments of the present invention for its use within three phase bridge circuit arrangements are shown in FIG. 7 and 8. These figures show three phase bridge circuits with a transformer secondary winding 5, controlled rectifiers 3, 3', 3'', diode 1, 1', 1'', quenching capacitors 6, 6', 6'' and quenching thyristors 8, 8', 8''. According to the present invention each of the quenching capacitors is connected in parallel with its own associated supplemental capacitor 15' via an associated blocking diode 13. Each supplemental capacitor 15' as already described only becomes effective when the polarity of the associated quenching capacitor 6 is reversed from the illustrated polarity. Auxiliary thyristors 19 are provided to discharge the supplemental capacitors 15'. FIGS. 7 and 8 differ from each other only in the nature of their charging currents. In FIG. 7, the circuit of the quenching capacitors 6, 6', and 6'' are charged via a charging path including a common charging resistor 10 and a charging diode 11 which are connected in series and respective charging diodes 11a, 11a' and 11a'' which are connected directly in parallel with the associated quenching thyristors 8, 8' and 8'' respectively. While in the circuit of FIG. 8, the charging of the quenching capacitors takes place via a common charging resistor 10 and respective charging diodes 11, 11' and 11''.

It will be understood that the above description of the present invention is susceptible to various modifications, changes and adaptations, and the same are intended to be comprehended within the means and range of equivalents of the appended claims.

We claim:

1. In a rectifier circuit for alternating current having a plurality of controlled rectifiers and a separate associated quenching means for each of the controlled rectifiers, each of the quenching means including a series circuit of a quenching capacitor and a control quenching thyristor with the series circuit being connected in parallel with the associated controlled rectifier, and charging means for charging the quenching capacitor to a first polarity, the improvement comprising: a supplemental capacitor connected in parallel with each of said quenching capacitors; a first coupling diode in the path connecting said supplemental capacitor and the associated said quenching capacitor; said supplemental capacitor and said first coupling diode being arranged so that said supplemental capacitor is chargeable only during the period of change of polarity of the charge of the associated said quenching capacitor; a load connected to the D.C. output terminals of said rectifier circuit; and discharge means connecting said supplemental capacitor to said load for causing discharge of said supplemental capacitor through said load.

2. A controlled rectifier circuit as defined in claim 1 wherein said rectifier circuit includes a single phase bridge circuit having a separate one of said controlled rectifiers in each of two branches thereof which are directly connected in series between the direct current output terminals of said bridge; and wherein two of said supplemental capacitors are provided, said two supplemental capacitors being connected in series, with each of said supplemental capacitors being connected in parallel with a separate one of said quenching capacitors associated with said controlled rectifiers.

3. A controlled rectifier circuit is defined in claim 2 further comprising a pair of diodes each of which is connected in parallel with a separate one of said supplemental capacitors with a polarity such that only voltage with a polarity opposite to the voltage across the associated quenching capacitor prior to quenching can be provided across the associated said supplemental capacitor.

4. A controlled rectifier circuit as defined in claim 1 wherein said rectifier circuit includes a single phase bridge circuit having a separate one of said controlled rectifiers in each of two branches thereof which are directly connected in series between the direct current output terminals of said bridge; and wherein one said supplemental capacitor is provided, said one supplemental capacitor being connected in parallel with both of said quenching capacitors associated with said controlled rectifiers.

5. A controlled rectifier circuit as defined in claim 4 further comprising: two serially connected diodes connected in parallel with said supplemental capacitor and having a polarity such that only a voltage with a polarity opposite to the polarity of the voltage in said quenching capacitors prior to quenching can be produced in said supplemental capacitor, the common point of connection of said two serially connected diodes being connected with said associated quenching capacitors in such a manner that said supplemental capacitor can be charged only during the period of change of polarity of the voltage in said quenching capacitors.

6. A controlled rectifier circuit as defined in claim 5 further comprising: an input transformer having its secondary winding connected between the input terminals of said bridge, each of said quenching thyristors being connected to one of said input terminals of said bridge circuit, two second coupling diodes, each of said second coupling diodes connecting said point of connection of said serially connected diodes with a respective one of the points of connection between each of said quenching capacitors and its associated said quenching thyristors.

7. A controlled rectifier circuit as defined in claim 5 further comprising: an input transformer having its secondary winding connected between the input terminals of said bridge circuit, each of said quenching capacitors being connected to one of said terminals of said bridge circuit, and said point of connection of said serially connected diodes also being connected with said one input terminal of said bridge circuit.

8. A controlled rectifier circuit as defined in claim 7 wherein each of said controlled rectifiers is connected with said one input terminal of said bridge circuit via one of said serially connected diodes connected in parallel with said supplemental capacitor so that said supplemental capacitor is arranged to be discharged through said load twice per period.

9. A controlled rectifier circuit as defined in claim 1 wherein said supplemental capacitor has a capacitance value greater than that of the associated said quenching capacitor.

10. A controlled rectifier circuit as defined in claim 9 wherein said quenching capacitors are designed according to a protection period equation ($C = i \cdot t_s/V_1$) so that the protection period $t_s$ required for said controlled rectifiers is assured and said supplemental capacitor is designed so as to be capable of absorbing the energy stored in any inductances of the alternating current circuit at the moment of quenching without producing unduly high voltages.

11. A controlled rectifier circuit as defined in claim 10 wherein said supplemental capacitor is a direct voltage capacitor.

12. A controlled rectifier circuit as defined in claim 1 wherein said discharge means includes first and second auxiliary thyristors, said first auxiliary thyristor connecting the terminal of said load connected to the positive output terminal of said rectifier circuit to the positive terminal of said supplemental capacitor, and said second auxiliary thyristor connecting the terminal of said load connected to the negative output terminal of said rectifier circuit to the negative terminal of said supplemental capacitor.

13. A controlled rectifier circuit as defined in claim 1 wherein said discharge means is a resistor connected in parallel with said supplemental capacitor, and means conductively connecting the terminal of said load connected to the positive output terminal of the rectifier circuit to the positive terminal of said supplemental capacitor and the terminal of said load connected to the negative output terminal of the rectifier circuit to the negative terminal of the supplemental capacitor.

* * * * *